United States Patent
Frost

(10) Patent No.: US 6,298,955 B1
(45) Date of Patent: Oct. 9, 2001

(54) SHAFT SEAL FOR ECCENTRIC AIR BRAKE LEVER

(75) Inventor: Mark L. Frost, Sterling Heights, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/426,492

(22) Filed: Oct. 26, 1999

(51) Int. Cl.[7] .............................. F16D 55/08; F16J 15/32
(52) U.S. Cl. .............................. 188/72.9; 277/561
(58) Field of Search .................. 188/71.1, 72.1, 188/72.8, 72.9, 72.4, 73.41, 73.42, 73.43, 73.46, 322.17, 72.6, 72.7, 73.1; 277/561

(56) References Cited

U.S. PATENT DOCUMENTS

| | | | |
|---|---|---|---|
| Re. 24,940 | * 2/1961 | Stephens | 277/561 |
| 3,783,981 | * 1/1974 | Burgdorft | 188/71.9 |
| 4,274,641 | * 6/1981 | Cather, Jr. | 277/561 |
| 4,304,416 | * 12/1981 | Oshima | 277/561 |
| 4,324,318 | * 4/1982 | Karasudani | 277/561 |
| 4,531,748 | * 7/1985 | Jackowski | 277/561 |
| 4,588,195 | * 5/1986 | Antonini | 277/561 |
| 4,598,800 | * 7/1986 | Marianu | 188/71.9 |
| 4,635,760 | * 1/1987 | Le Marchand et al. | 188/71.9 |
| 4,660,684 | * 4/1987 | Carre et al. | 188/71.9 |
| 4,691,809 | * 9/1987 | Le Marchand et al. | 188/71.9 |
| 5,244,215 | * 9/1993 | Cather, Jr. et al. | 277/561 |
| 5,738,189 | 4/1998 | Bennett et al. | 188/72.9 |
| 5,794,738 | 8/1998 | Forni et al. | 188/72.9 |

FOREIGN PATENT DOCUMENTS

3236076-A1 * 3/1984 (DE) .
36 10 569-A1 * 10/1987 (DE) .
3812495-A1 * 10/1989 (DE) .

* cited by examiner

Primary Examiner—Robert J. Oberleitner
Assistant Examiner—Thomas J. Williams
(74) Attorney, Agent, or Firm—Carlson, Gaskey & Olds

(57) ABSTRACT

An improved seal for use between an eccentric shaft and a brake caliper in an air disc brake system incorporates a flexible portion between the fixed portion which is fixed to the caliper and the floating portion which is received on the shaft. The flexible portion is preferably formed of a thinner rubber area, and also extends axially outward of both the fixed and floating areas. The flexible portion facilitates skewing and axial movement of the eccentric shaft within the caliper.

12 Claims, 2 Drawing Sheets

SHAFT SEAL FOR ECCENTRIC AIR BRAKE LEVER

BACKGROUND OF THE INVENTION

This invention relates to an improved seal for use on the eccentric shafts which actuate air disc brakes, wherein the seal accommodates shaft movement.

Many heavy vehicles utilize air-driven disc brakes. In a standard air-driven disc brake, an air brake actuator selectively extends a push rod to turn an actuation lever. The actuation lever drives an eccentric shaft to rotate. The shaft is mounted eccentrically within an actuation block. When the eccentric shaft turns, it forces the block towards a surface which is to be braked.

As known, the area where the actuation lever attaches to the eccentric shaft is typically outward of a braking assembly. It is desirable to seal this outer area from the inner reaction surfaces between the shaft and the block. Typically, known seals have been a relatively rigid part with resilient sealing portions for engaging against the shaft. A housing, known as a caliper, encloses the block. The seal is typically fixed to the caliper.

The use of the relatively rigid seal body has presented some problems due to practical realities in this type of brake system. In one major problem, the eccentric shaft may sometimes become skewed within the block. When this happens, the seal utilized in the prior art is not as effective, since the seal is designed based upon the assumption that the shaft will be perpendicular to an opening within the block. Thus, the prior art seal does not function as effectively if the shaft is skew, which does happen in braking applications.

When the eccentric shaft has become skew within the prior art seal, there has sometimes been deformation of the sealing area. This is, of course, undesirable.

Also from time-to-time the shaft may move axially which also makes it difficult for the seal to perform properly.

SUMMARY OF THE INVENTION

In a disclosed embodiment of this invention, a seal between the eccentric shaft and the caliper in a disc brake system has a flexible portion between a portion which contacts the shaft and a portion connected to the caliper. The flexible portion is preferably made to be somewhat thinner than the portions contacting the shaft or the caliper. In this way, the portion is able to flex relative to either areas to accommodate shaft skewing, and axial shaft movement.

In a preferred embodiment, the portion which contacts the shaft also has structure for positioning it axially relative to the shaft. In one embodiment, the structure includes a bead on the seal extending into a retention groove on the shaft. In another embodiment, the seal may have a seal stop which contacts a ledge end surface on the shaft. In an alternative embodiment, a finger may extend from the seal and contact a tapered portion on the shaft.

The present invention improves upon the shaft seals utilized in this application by providing a seal which can accommodate shaft skewing, and axial shaft movement. Thus, the inventive seal is better able to withstand and accommodate the real world problem that an eccentric shaft may sometime be skewed and may move axially. These and other features of the present invention can be best understood from the following specification and drawings, the following of which is a brief description.

DETAILED DESCRIPTION OF A PREFERRED EMBODIMENT

Figure 1:
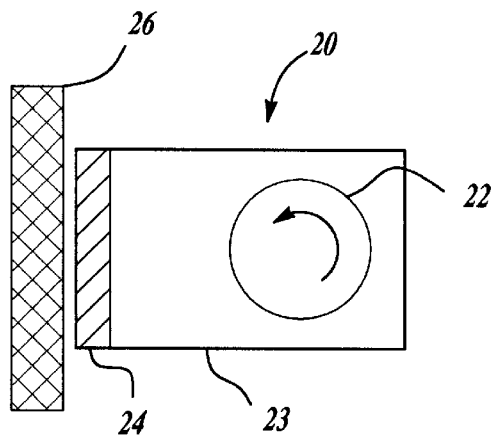
FIG. 1 is a schematic view of a brake system according to the present invention.

FIG. 1 shows a braking system 20 quite schematically. An eccentric shaft 22 moves within an actuation block 23 to move a friction surface 24 towards a surface 26 to be braked, such as a wheel rotor. As known, the shaft 22 is eccentrically mounted within the block 23 such that upon rotation the block 23 is moved axially. As also known, block 23 is mounted in a caliper 100, as shown in FIG. 2.

Figure 2:
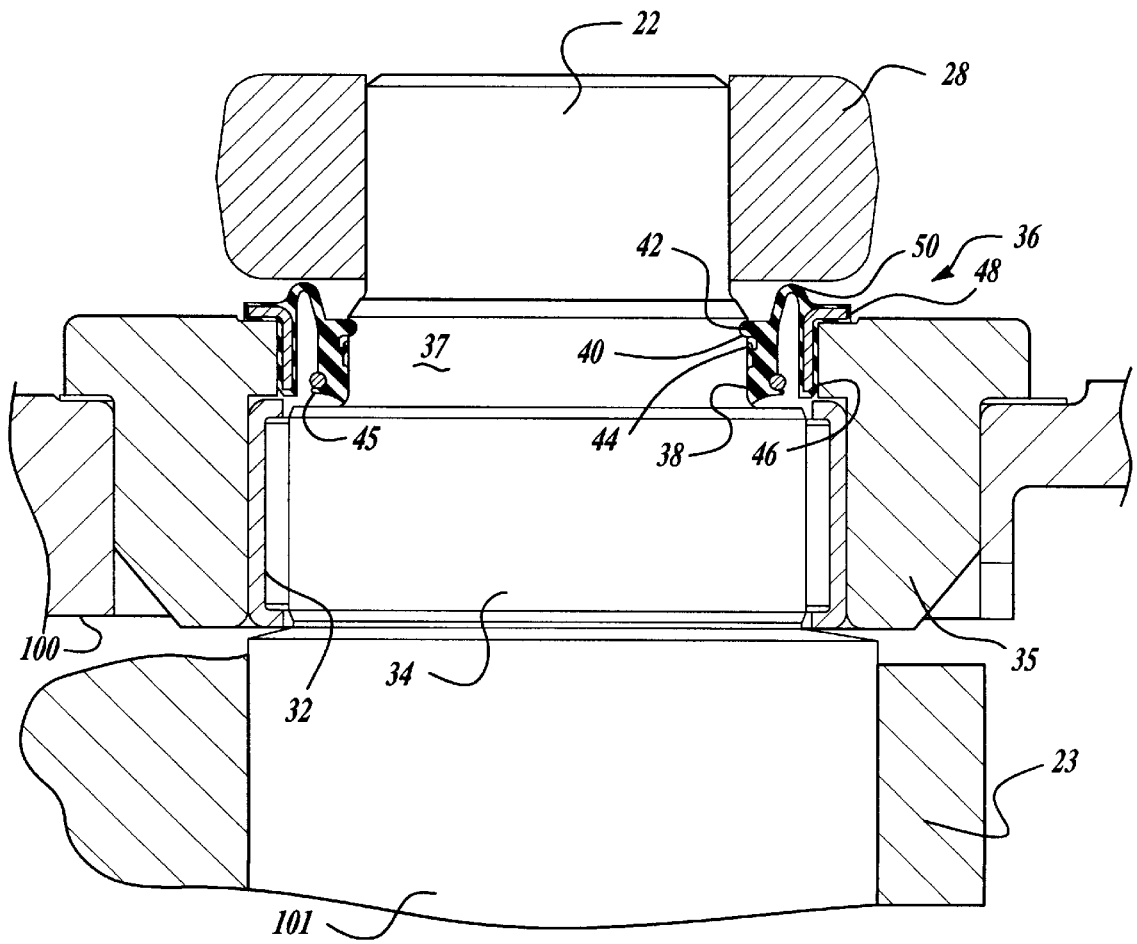
FIG. 2 is a cross-sectional view showing the inventive seal.

FIG. 2 shows eccentric shaft 22 receiving a lever 28. The lever 28 is driven by an air brake, as known, to turn shaft 22. Shaft 22 turns when lever 28 turns. The shaft 22 is received in a needle bearing 32 at a portion 34. Portion 34 is received eccentrically within a shaft cover 35, which is fixed to caliper 100. For purposes of this application, the shaft cover 35 is termed to be a part of the caliper 100 for claiming and description purposes. A forward portion 101 of the shaft drives block 23.

A seal assembly 36 is positioned between the cover 35 and an intermediate portion 37 of the shaft 22. The seal assembly 36 incorporates a floating seal portion 38 which contacts the shaft section 37, and seals an area inward of the seal from the external area of the brake which receives the shaft portion 22 and the lever 28. The function of seal 36 is to prevent the ingress of dirt or other contaminants into the area between the portion 34 and the needle bearing 32. A positioning lip 40 is received in a groove 42 in the portion 37 of the shaft, to position the floating seal area 38 relative to the shaft 22 and prevent undue axial movement. A sealing lip 44 seals against the shaft portion 37.

An outer fixed portion 46 of the seal 36 is secured to the cover 35. An internal rigid metal portion 48 is molded into the portion 46 to provide rigidity. A flexible portion 50 separates the fixed portion 46 from the floating portion 38. The flexible portion 50 is preferably formed to be thinner than the rubber associated with the portions 46 or 38 such that it is allowed to flex.

Figure 3:
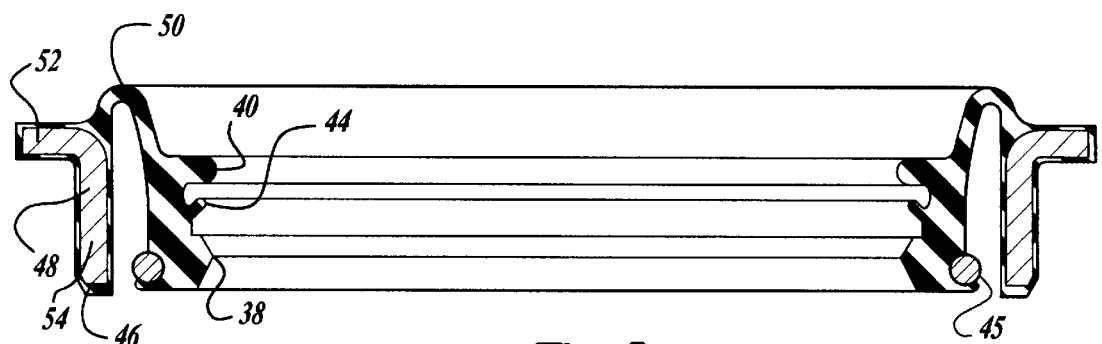
FIG. 3 is a cross-sectional view through the seal in a relaxed position.

As shown in FIG. 3, the rigid portion 46 includes the metal portion 48 having a generally elongate portion 54 and an outwardly turned portion 52. The flexible portion 50 extends axially beyond the rigid portion 52, and also axially beyond the sealing lips 44 or the positioning lip 40. As can be seen, portion 50 is generally U-shaped. Thus, the flexible portion is outward of the portions which are connected to the surfaces to be sealed. This facilitates the flexibility of the portion 50, and allows it to adjust to skewing of the shaft 22 within the cover 35.

As can be appreciated, since the portion 50 is thinner, it is more flexible, and thus can accommodate the skewing movement while still maintaining floating portion 38 in contact with the shaft and portion 46 secured to the cover 35. A ring 45 maintains the seal portion 38 in contact with the portion 37 of the shaft 22.

Figure 4:
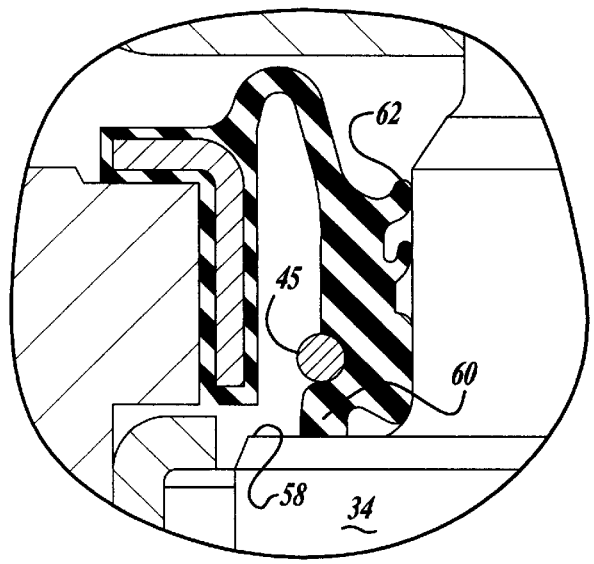
FIG. 4 shows a second embodiment.

FIG. 4 shows an alternative embodiment where the positioning lip 40 is replaced by a stop surface 60 abutting an end ledge 58 of the shaft portion 34. The stop surface 60 abuts portion 58, and further axial movement of the seal is prevented.

Figure 5:
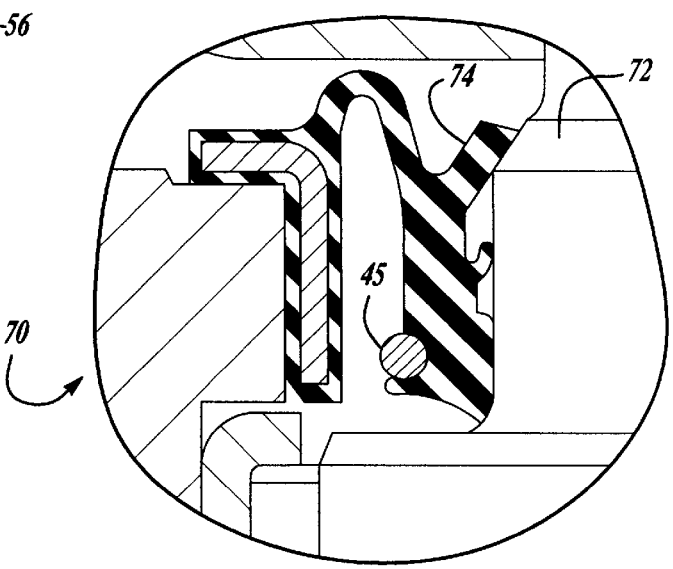
FIG. 5 shows a third embodiment.

FIG. 5 shows yet another embodiment 70 wherein an angularly extending lip 74 sits on a tapered portion 72 of the shaft 22. Friction between the portion 74 and the portion 72 will prevent axial movement of the seal.

The seal is preferably molded of rubber, or other materials as are presently utilized in seals for similar environments. Further, the metal portion is formed of a metal such as is typically utilized in such seals.

Although preferred embodiments of this invention have been disclosed, a worker in this art would recognize that certain modifications will come within the scope of this invention. For that reason, the following claims should be studied to determine the true scope and content of this invention.

What is claimed is:

1. A disc brake assembly comprising:
   an actuation lever for driving an eccentric shaft, said eccentric shaft attached to said actuation lever, said eccentric shaft having an outer end secured to said actuation lever, a forward end operably received to move an actuation block and a brake caliper between said lever and said forward end; and
   a seal received between said eccentric shaft and said caliper, and between said forward and outer ends of said eccentric shaft, said seal having a radially inner floating portion received on said eccentric shaft, and an outer portion attached to said caliper, and an intermediate flexible portion between said inner and outer seal portions which accommodates movement of said eccentric shaft within said caliper, said eccentric shaft being surrounding by said actuation block.

2. A brake as recited in claim 1, wherein a shaft cover is received within said caliper and is the portion of said caliper which is contacted by said outer portion of said seal.

3. A brake as recited in claim 1, wherein said flexible portion is at least partially formed by forming said flexible area to be thinner than said inner or outer portions of said seal.

4. A brake as recited in claim 3, wherein said flexible portion extends outwardly toward said outer end beyond either said outer or said inner seal portions to make said flexible portion more adaptable to accommodating skewing movement.

5. A brake as recited in claim 1, wherein said inner seal portion has positioning structure in contact with said eccentric shaft for preventing undue axial movement of said seal floating portion.

6. A brake as recited in claim 5, wherein said positioning structure includes a lip formed on said seal received in a retention groove in said eccentric shaft.

7. A brake as recited in claim 5, wherein said positioning structure includes a seal stop surface being axially in contact with an outwardly extending ledge on said eccentric shaft.

8. A brake as recited in claim 5, wherein said positioning structure includes an angularly inwardly extending lip portion on said seal frictionally engaging a tapered portion of said eccentric shaft to prevent undue axial movement of said floating portion of said seal.

9. A brake assembly comprising:
   an actuation lever for driving an eccentric shaft, said eccentric shaft attached to said actuation lever, said eccentric shaft having an outer end secured to said actuation lever and a forward end operably received to move an actuation block and a brake caliper between said lever and said forward end; and
   a seal received between said eccentric shaft and said caliper; and between said outer and forward ends of said eccentric shaft, said seal having a radially inner floating portion which is received on said eccentric shaft, and an outer portion which is attached to said caliper, and having an intermediate flexible portion between said inner and outer seal portions which accommodates skewing movement of said eccentric shaft within said caliper, said outer seal portion including an internal metal member extending axially along an axis of rotation of said eccentric shaft and having a radially outwardly turned lip positioned axially outwardly of said caliper, and said flexible portion being formed in part by a thinner portion at said flexible portion relative to said inner and outer portion, and further having said flexible portion being positioned axially outwardly of said inner or outer seal portions, and said inner seal portions being positioned on said eccentric shaft by an axial positioning structure that prevents undue axial movement of said inner portion, said eccentric shaft being surrounding by said actuation block.

10. A brake as recited in claim 9, wherein said positioning structure includes a lip formed on said seal received in a retention groove in said eccentric shaft.

11. A brake as recited in claim 9, wherein said positioning structure includes a seal stop surface being axially in contact with an outwardly extending ledge on said eccentric shaft.

12. A brake as recited in claim 9, wherein said positioning structure includes an angularly inwardly extending lip portion on said seal frictionally engaging a tapered portion of said eccentric shaft to prevent undue axial movement of said floating portion of said seal.

\* \* \* \* \*